April 18, 1939.   D. C. SIMPSON ET AL   2,154,476
APPARATUS FOR MANUFACTURING GLASS WOOL BATS AND OTHER ARTICLES
Original Filed March 12, 1934   9 Sheets-Sheet 1
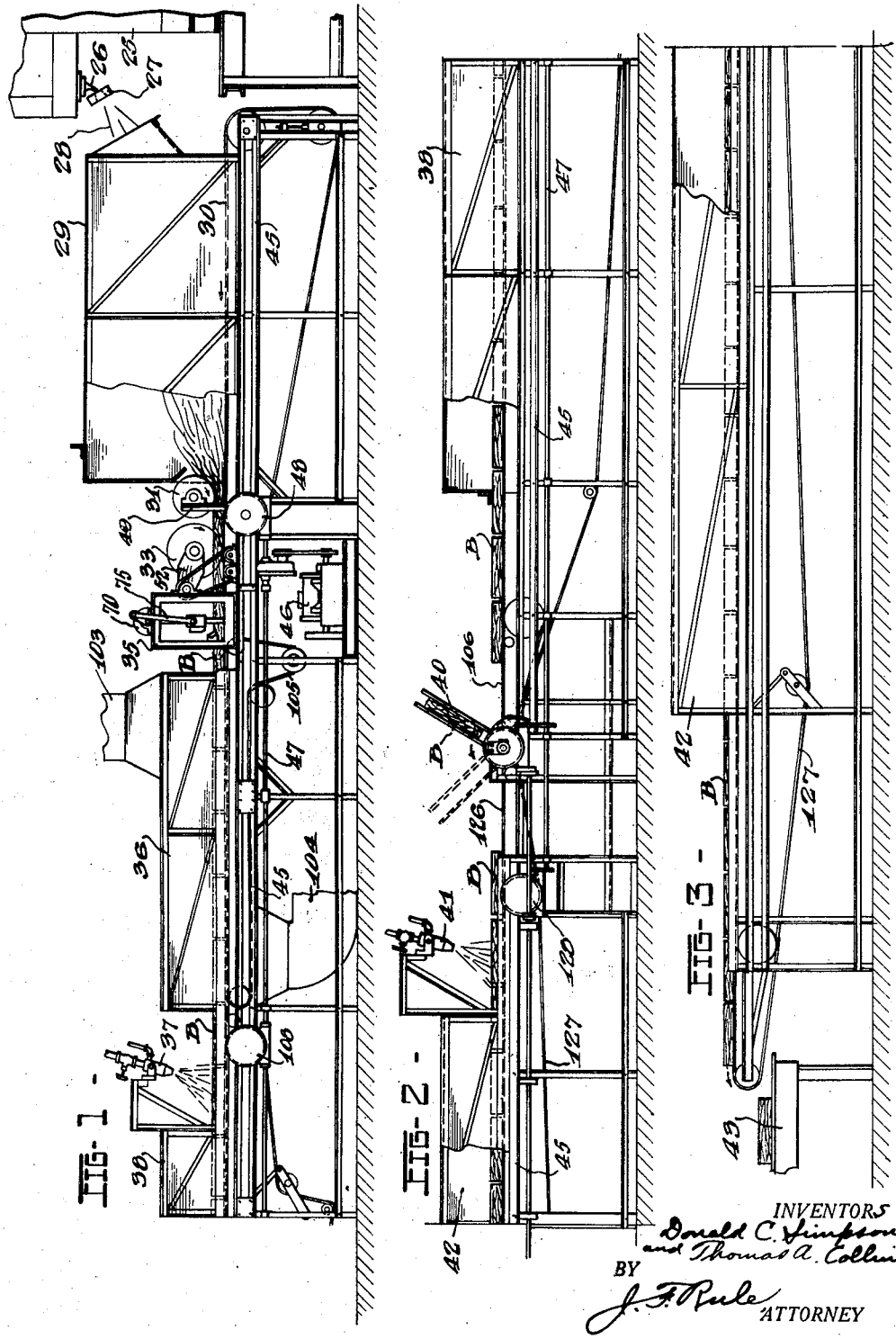

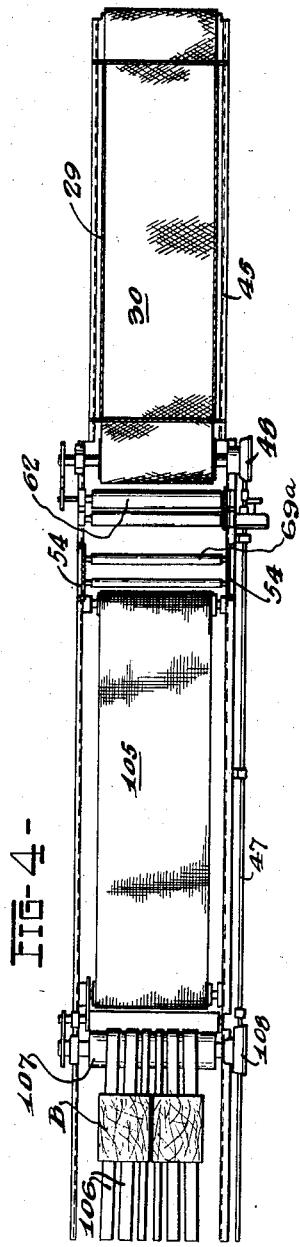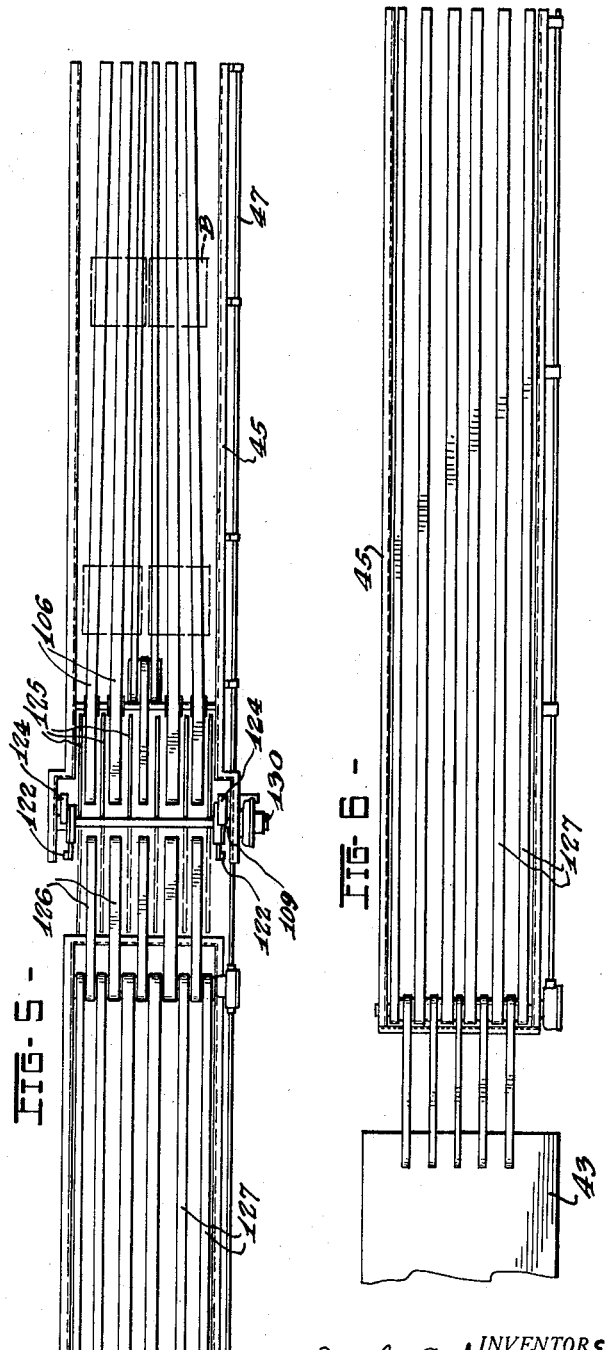

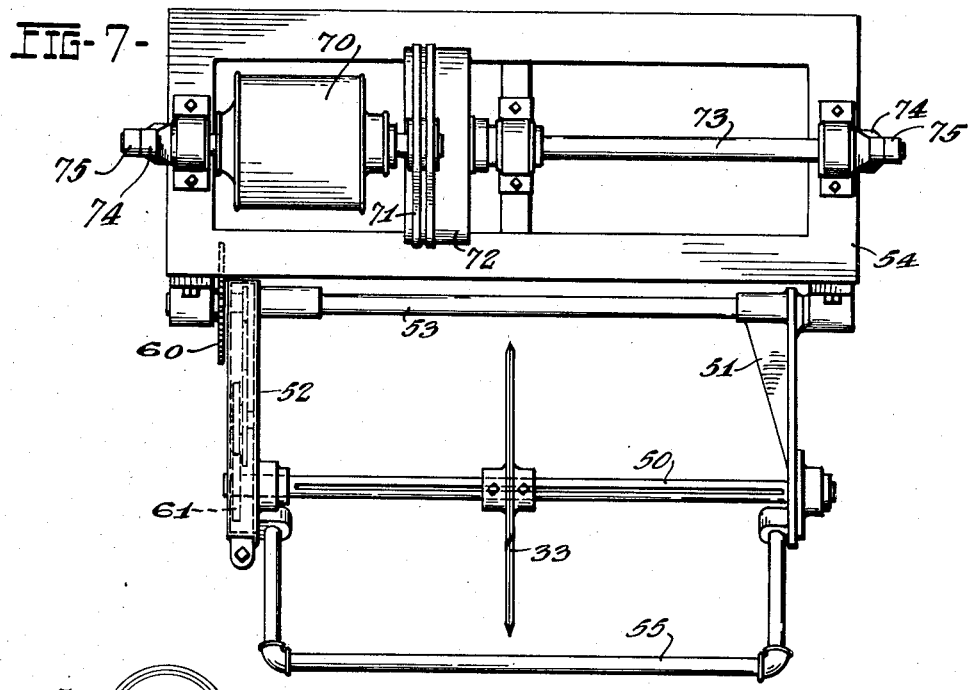
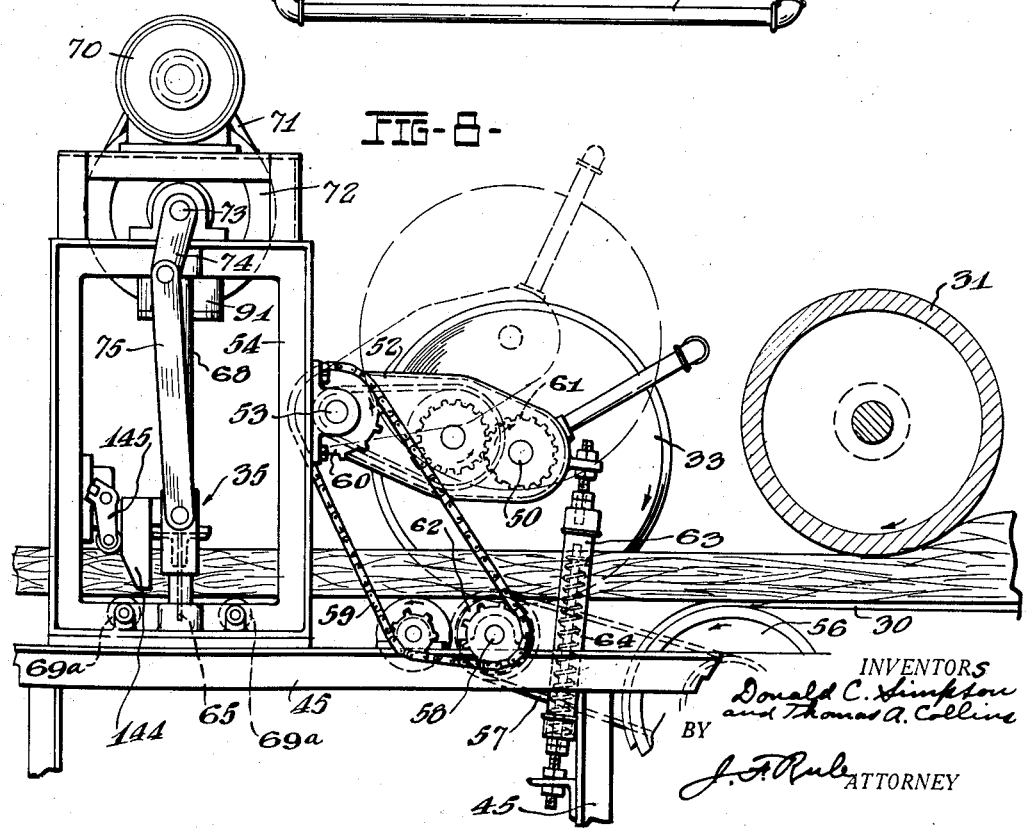

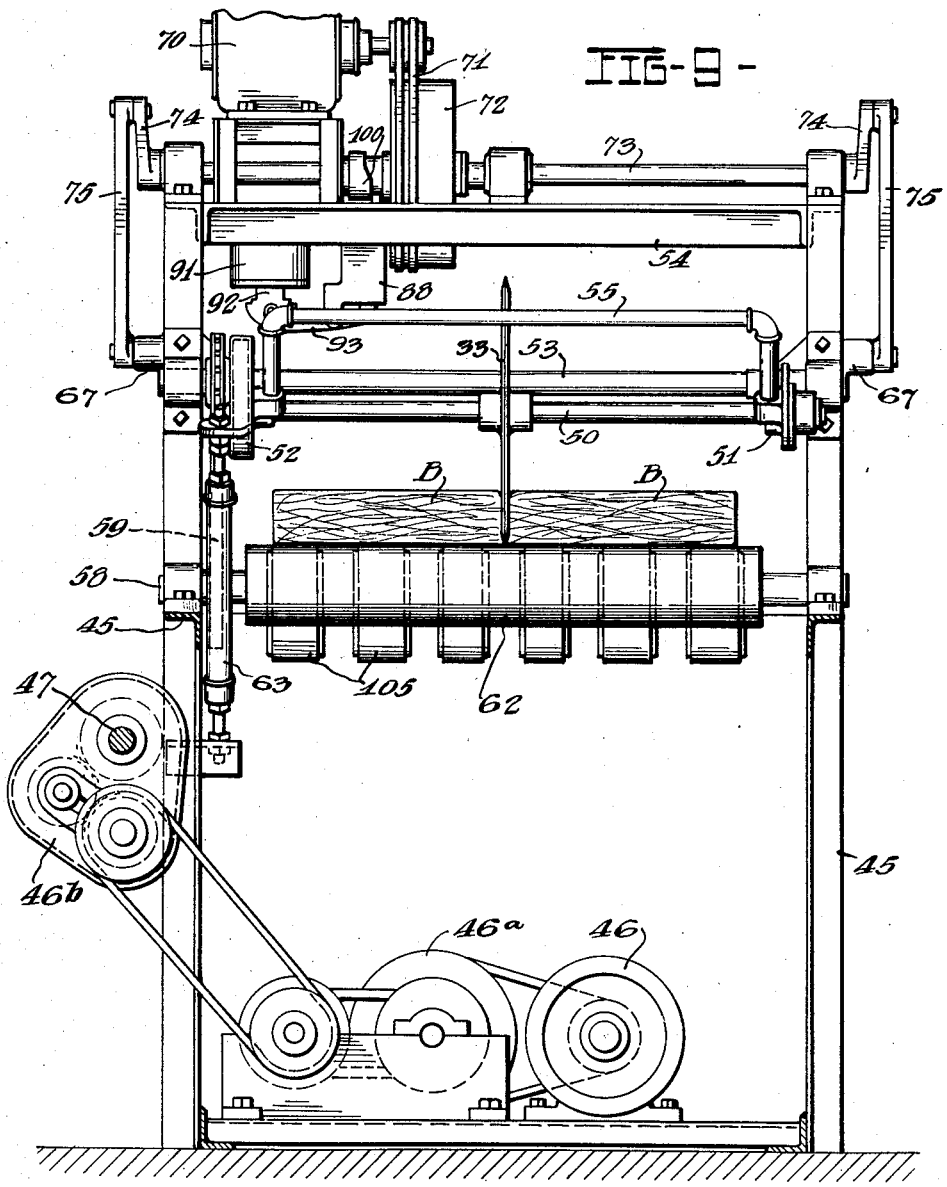

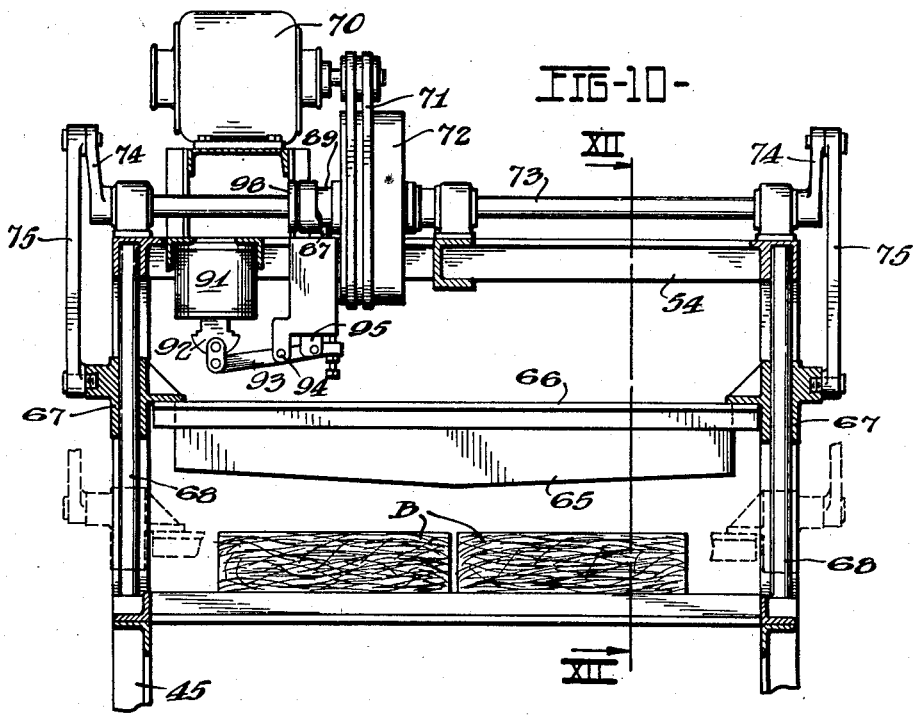
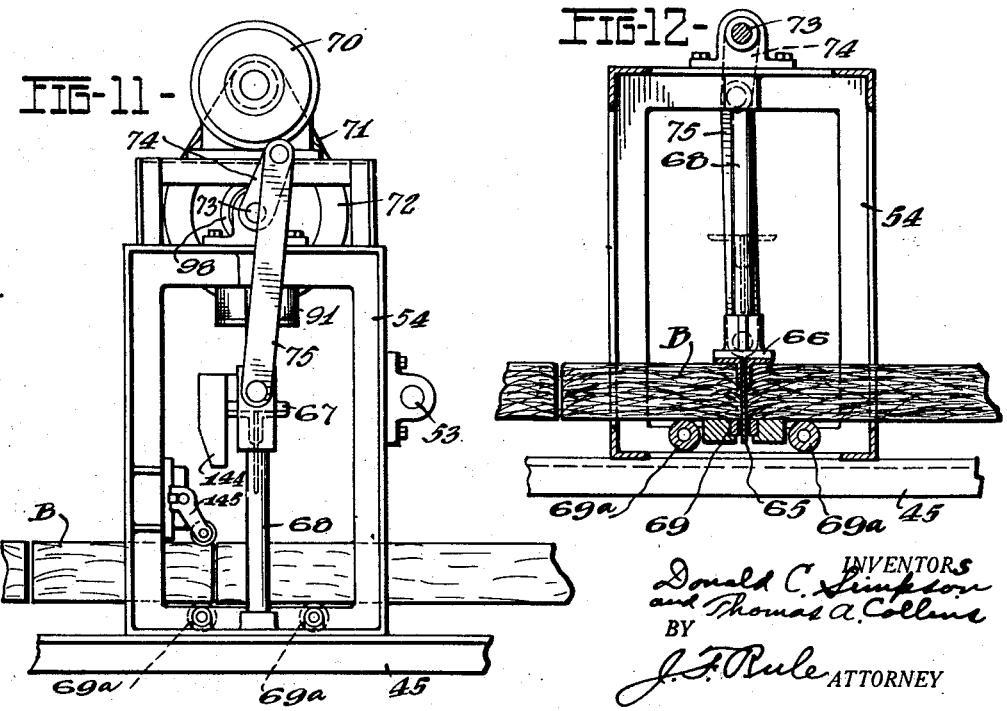

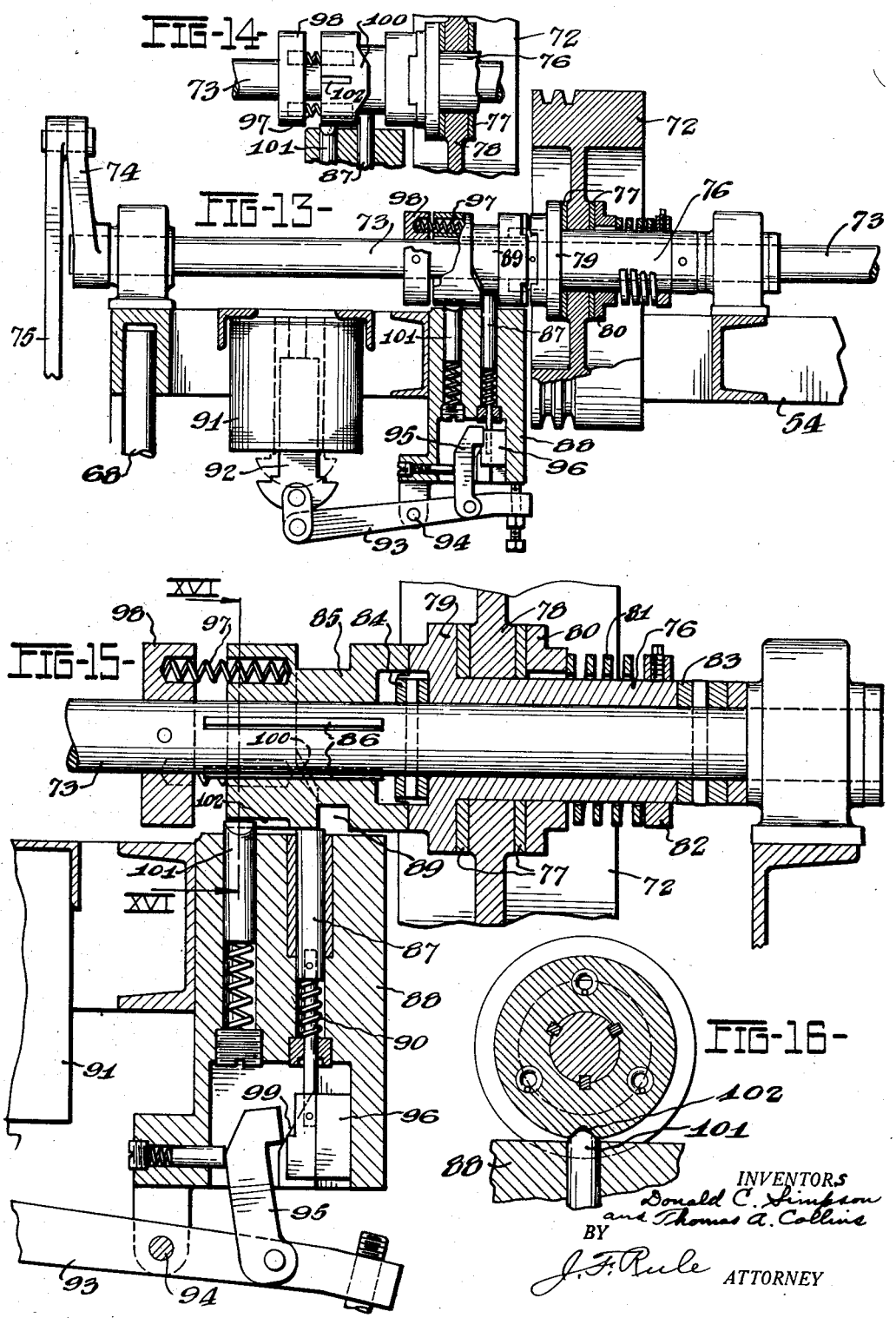

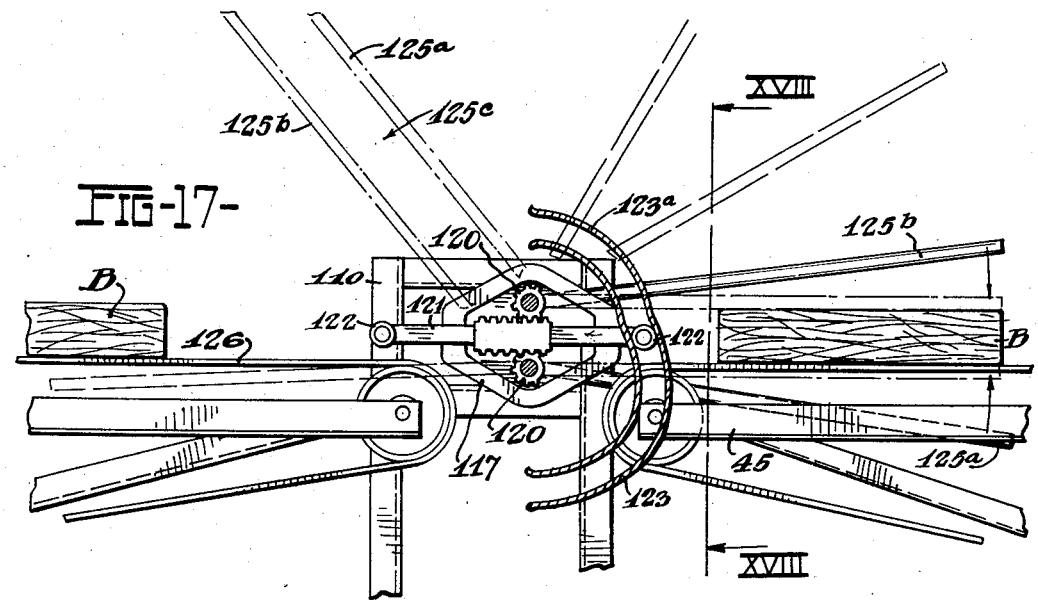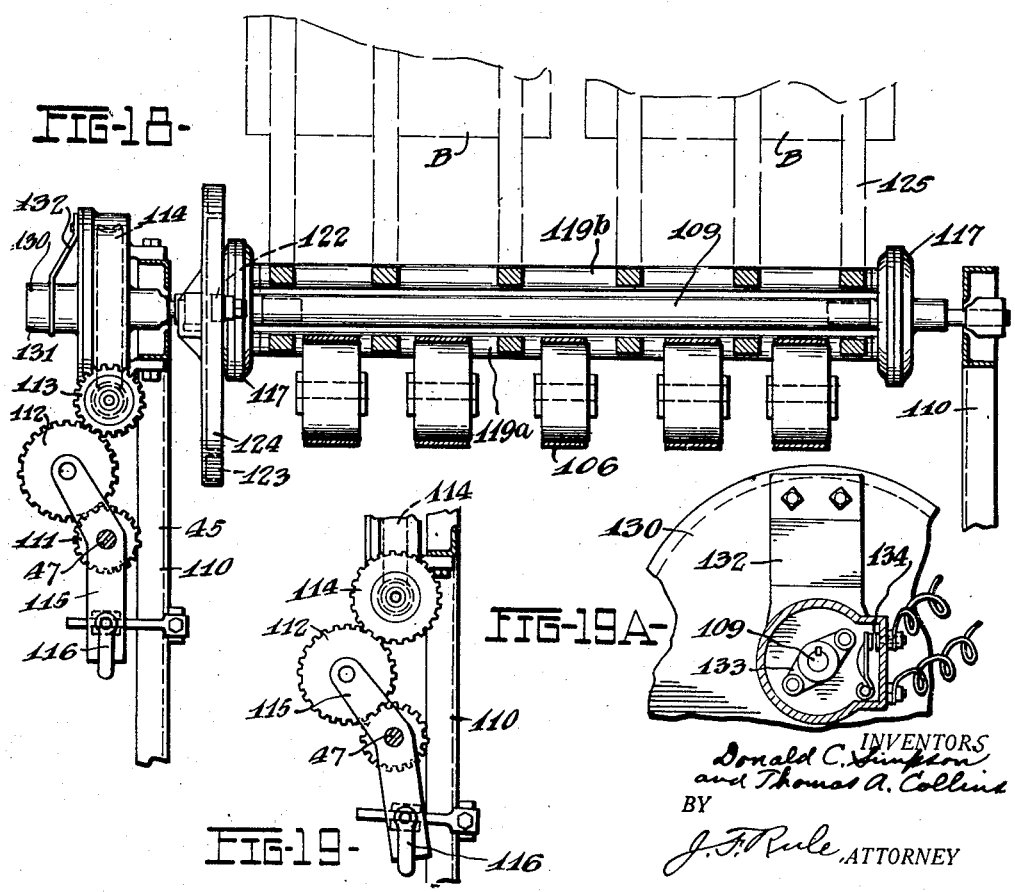

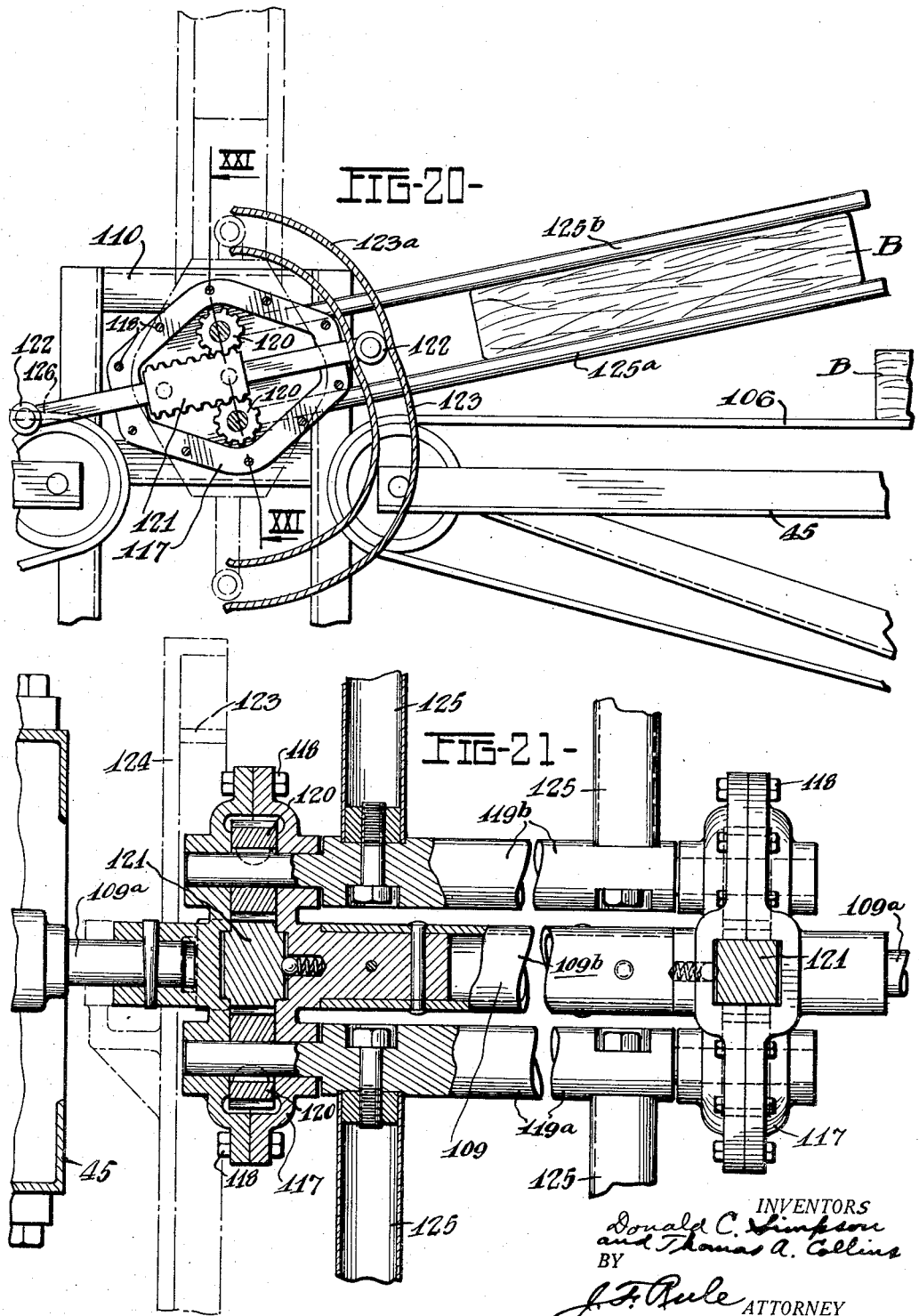

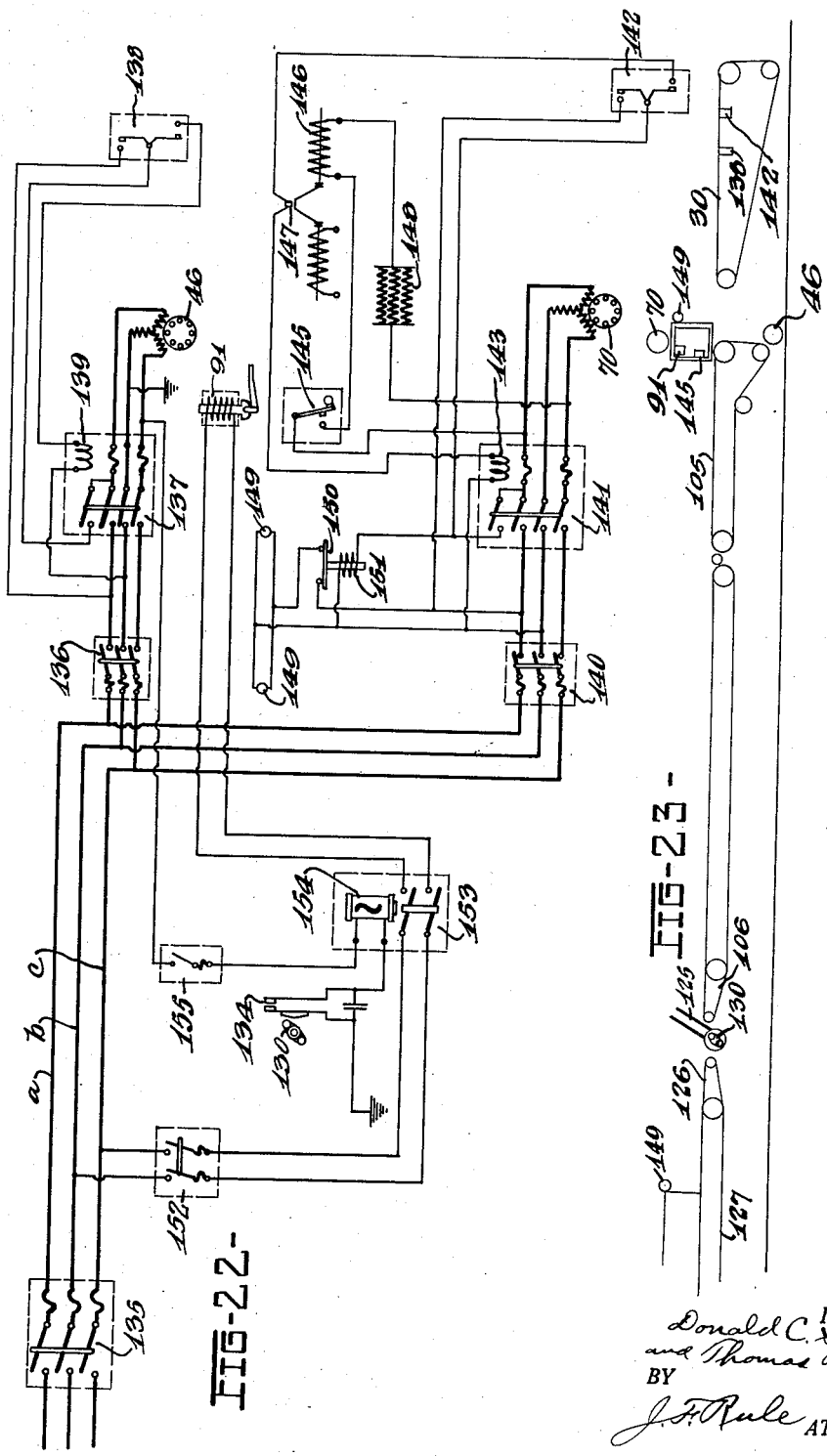

Patented Apr. 18, 1939

2,154,476

UNITED STATES PATENT OFFICE 2,154,476

APPARATUS FOR MANUFACTURING GLASS WOOL BATS AND OTHER ARTICLES

Donald C. Simpson, Newark, Ohio, and Thomas A. Collins, Marion, Ind., assignors, by mesne assignments, to Owens-Corning Fiberglas Corporation, a corporation of Delaware Application March 12, 1934, Serial No. 715,088
Renewed May 18, 1937

17 Claims. (Cl. 154—27)

Our invention relates to apparatus for producing wool or fibrous material from glass or other substances and fabricating the material into various articles of manufacture as, for example, insulating bats of various sizes and shapes, insulating bulk wool material, eliminator mats, acoustical material, battery separator plates, electrical insulating tape, and other products. The invention as herein illustrated and described is embodied in an apparatus comprising means for continuously producing and forming the wool into a mat, continuously advancing the mat, treating the wool with a binding material or materials, cutting the mat as it advances, into individual bats or other articles, and tempering, spraying, drying, conveying and delivering the articles.

An object of the invention is to provide novel and practical means for inverting the severed bats as they are advanced, after the upper surfaces thereof have been sprayed or treated with a coating material. In this manner the opposite surfaces are presented for a spraying operation, thereby facilitating an effective treating of the bats with the coating material.

A further object of the invention is to provide automatic means by which the operations of the bat severing and inverting mechanisms are synchronized. The invention provides means whereby the operation of the severing mechanism may be controlled, for example, by the inverting mechanism, so that the mechanisms operate in timed relation.

Other objects of the invention will appear hereinafter.

Referring to the accompanying drawings:

Figs. 1, 2 and 3 are sectional elevations showing, respectively, the right hand portion, intermediate portion and left hand portion of an apparatus constructed in accordance with our invention.

Figs. 4, 5 and 6 are plan views corresponding, respectively, to Figs. 1, 2 and 3, showing particularly the conveying apparatus, the mechanisms above the conveying apparatus being for the most part omitted.

Fig. 7 is a top plan view showing the chopper operating mechanism and the disk cutter mechanism for slitting the mat longitudinally.

Fig. 8 is a part sectional side elevation of the mechanism shown in Fig. 7, and also showing the compressor roll.

Fig. 9 is an elevation of the chopping and slitting mechanism, viewed in the direction of travel of the conveyors.

Fig. 10 is a part sectional front elevation of the chopping mechanism.

Fig. 11 is an end elevation of the same.

Fig. 12 is a section at the line XII—XII on Fig. 10, but showing the chopper in its lowered position.

Fig. 13 is a fragmentary part sectional elevation showing particularly the electro-magnetic clutch control mechanism for the chopper.

Fig. 14 is a fragmentary view showing the clutch members engaged.

Fig. 15 is a fragmentary sectional elevation on a larger scale of mechanism shown in Fig. 13.

Fig. 16 is a section at the line XVI—XVI on Fig. 15, showing particularly a holding detent for one of the clutch members.

Figs. 17 to 21, inclusive, illustrate the bat inverting or flop-over mechanism by which the wool bats are picked up from one conveyor, inverted and deposited on another conveyor. Fig. 17 is a part sectional side elevation of the inverting mechanism. Fig. 18 is a section at the line XVIII—XVIII on Fig. 17. Fig. 19 is a detail view showing a train of gearing for driving the inverting mechanism. Fig. 19A is a detail view of the timer device for synchronizing the operations of the chopper and the inverting mechanism. Fig. 20 is a fragmentary view similar to Fig. 17, but on a larger scale and showing the moving parts in a different position. Fig. 21 is a part sectional elevation of mechanism shown in Fig. 20, but with the parts in a different relative position, the section being taken at the line XXI—XXI on Fig. 20.

Fig. 22 is a wiring diagram showing the electric motors and controlling devices and their circuits.

Fig. 23 is a diagrammatic view of the conveyors and various control devices.

The apparatus as herein shown is particularly adapted for reducing molten glass to the form of wool and making the same into rectangular bats, and is hereinafter particularly described as designed and used for this specific purpose, but it will be understood that other materials may be used and various other articles may be fabricated in accordance with the principles of our invention.

General arrangement

A general statement of the arrangement of the apparatus and the several operations involved in making wool bats is as follows:

Referring to Figs. 1 to 6, inclusive, which show the general arrangement of the assembled mechanisms, a glass melting and refining furnace 25 supplies continuous streams of molten glass 26 which are drawn through blowers 27 and reduced to filaments 28 which are blown into a hood 29 and accumulate in the form of wool on a conveyor 30. The conveyor is driven continuously and carries the wool forward to and beneath a compressing roll 31 by which it is compressed to form a continuous mat of substantially uniform thickness. The mat advances to slitting mechanism comprising a cutter disk or disks 33 by which it is slit longitudinally into two or more separate strips. These pass through a chopping device 35 comprising a transverse blade which is periodically reciprocated vertically to chop the strips into individual mats of predetermined length. The mats are carried forward on an endless conveyor 105 into and through a drying and tempering oven 36 through which air at a high temperature is circulated. This serves to dry out any remaining moisture which may have been introduced by the steam blowers 27 and also serves to diffuse the oil with which the wool is sometimes treated. This oil which may be introduced, for example, through the steam blower, may be supplied when the wool is used for filtering purposes, to give a viscous coating to the wool fibers so that dust and the like will adhere thereto when the material is operating as a filter. For other purposes, a lighter grade of oil and in much smaller quantities may be used for tempering the glass or for other purposes.

As the wool passes beyond the oven 36, it may be sprayed by means of a spraying device 37, with latex or other binding material. From this point the bats are carried on endless belt conveyors into and through a drying oven 38 (Figs. 1 and 2). After passing beyond the oven 38 the bats are inverted by an automatic flop-over or inverting device 40 and placed, other side up, on conveyors which carry them beneath a second spraying device 41 which sprays the opposite sides of the bats. From this point the bats travel through another drying oven 42 and are delivered to a table 43 (Fig. 3) or other receiving means.

The wool, from the time it is deposited on the conveyor 30, is carried forward by a continuous movement until discharged onto the receiving table 43, this forward movement being effected mainly by a series of horizontal conveyors all arranged at the same level and supported on a framework 45 extending the entire width of the apparatus. The conveyors are driven by an electric motor 46 (Figs. 1 and 9) which has driving connections, through reduction gearing 46ᵃ and 46ᵇ, with a drive shaft 47. The drive shaft has a driving connection through reduction gearing within a gear box 48, with the endless conveyor 30 which is preferably in the form of a wire mesh screen which allows the passage therethrough of the steam or air from the blowers 27.

The compressing roll 31 may be supported on standards 49 and is adjustable up and down thereon for compressing the mat to any desired thickness. This roll may be positively driven preferably at the same surface speed as the conveyor 30.

Slitting mechanism

The mat passes forward from the compressing roll 31 to the slitting mechanism (Figs. 7 to 9). This mechanism comprises one or more circular cutting disks 33 mounted on a horizontal shaft 50 which extends transversely of the mat. The shaft 50 is journaled in a frame comprising arms 51 and 52 mounted to rock up and down on a shaft 53, the latter having bearings on a frame 54 which also supports the chopping mechanism 35. The frame which carries the disk 33 also includes a frame member 55 which serves as a guard. The disk carrying shaft 50 is driven through a train of gearing extending from the driving roll 56 (Fig. 8) of the conveyor 30, said roll having a driving connection 57 with a shaft 58, the latter having a sprocket and chain driving connection 59 with a sprocket 60 on the shaft 53. The arm 52 is in the form of a gear box having a train of gearing 61 extending to the cutter shaft 50 for driving the latter. The cutter disk 33 bears on a roll 62 mounted on and driven by the shaft 58. The roll 62 and cutter 33 are preferably driven at the same peripheral speed. Said speed is also preferably that at which the mat advances. The cutter disk is held against the roll 62 with a yielding pressure by means of an arm 63 comprising telescoping sections with an interposed coil spring 64. The arm 63 has adjustable connections at its ends with the swinging cutter frame and the framework 45, respectively, permitting adjustment of the tension on the cutter disk. As the mat advances over the roll 62, it is slit or severed into two or more strips, depending on the number of disk cutters 33 employed, said strips being cut to any desired width, depending on the adjustment of the cutters lengthwise of the shaft 50.

Chopping mechanism

After advancing beyond the slitting disks, the strips are cut transversely into rectangular bats by means of the chopping mechanism shown in detail in Figs. 7 to 12. This mechanism comprises a horizontally disposed chopping blade 65 above the path of the mat and extending transversely thereof. The blade is carried by a pair of angle bars 66 extending lengthwise thereof and between which the upper edge of the blade is clamped, said angle bars being secured at their ends to heads 67. Said heads are formed with bearing sleeves mounted to reciprocate on vertical guide rods 68 in the ends of the frame 54. As the cutter blade is lowered, the cutting edge moves downward between a pair of bars 69 spaced to provide a slot for the blade, said bars extending lengthwise of the blade and attached at their ends to a frame 54. The edge of the blade, as shown, is tapered or inclined upwardly from the center to the ends so that it cooperates with shear plates on the bars 69 to produce a shear cut. The angle bars 66 cooperate with the bars 69 to momentarily grip and compact the mat along the severed edges. Rolls 69ᵃ on opposite sides of the bars 69, support the mat as it passes through the chopper.

The chopper is driven by a continuously running electric motor 70 mounted on the frame 54, said motor having a belt connection 71 with a pulley 72 mounted on a drive shaft 73. Crank arms 74 secured to the ends of the shaft 73 are connected through links 75 with the heads 67. The shaft 73 is intermittently rotated periodically through one complete rotation in the manner hereinafter described and thereby periodically reciprocates the chopper 65.

The mechanism for controlling the periodic rotations of the cutter drive shaft 73 will now be described, such mechanism being shown in detail in Figs. 13 to 16. The pulley 72 is mounted on a bearing sleeve 76 which in turn is mounted to rotate freely on the shaft 73. The pulley has a friction driving connection with the sleeve 76 which serves as a safety device permitting the pulley to rotate independently of the bearing sleeve 76 in the event of any excessive load or obstruction which would interfere with the sleeve 76 being normally driven by the pulley. The friction driving connection comprises a pair of frictional disks 77 on opposite sides of the hub or web 78 of the pulley. One of said disks bears against a flange portion 79 of the sleeve 76. A collar 80 bears against the other disk, being held thereagainst by a coil spring 81 between the collar 80 and a collar 82 keyed to the sleeve 76. Movement of the sleeve 76 lengthwise of the shaft 73 is prevented by collars 83 and 84 placed at opposite ends of the said sleeve and keyed to the shaft 73.

The pulley 72 is periodically connected to the drive shaft 73 through a clutch comprising a clutch member or sleeve 85 mounted to slide lengthwise of the drive shaft and held against rotation relative to the shaft by keys 86. The left hand end of the bearing sleeve 76 is shaped to form the other member of the clutch. The clutch members are periodically separated and held apart, as shown in Fig. 13, by means of a holding pin 87 mounted in a bearing block 88 and movable into and out of an annular recess or groove 89 formed in the clutch member 85, said holding pin being projected into said groove by means of a coil spring 90.

The holding pin is periodically withdrawn from the clutch by means of an electro-magnet 91 having a core 92 connected to a lever 93 fulcrumed at 94 on the block 88. The lever carries a trigger 95 which engages a shoulder formed on a head 96 attached to the holding pin 87. When the magnet is energized, the lever 93 operates through the trigger 95 to draw the pin 87 out of the groove 89. This permits the sliding clutch member 85 to be moved into engagement with the clutch member 79 by means of coil springs 97 interposed between the clutch sleeve 85 and a collar 98 keyed to the shaft 73. When the clutch members are thus engaged, the continuously rotating pulley 72 imparts a rotation to the cutter drive shaft 73 for operating the chopping blade 65. When the electro-magnet is energized, the trigger 95 during its downward movement is cammed away from the head 96 by means of a cam 99 (Fig. 15), thereby releasing the holding pin 87 after it has been withdrawn from the clutch member 85. The holding pin 87 is prevented from immediately reentering the groove 89, by a cam projection 100 formed on a wall of the cam groove. As soon as the shaft commences to rotate, the projection 100 is carried beyond the holding pin 87 permitting the latter to reenter the widened portion of the groove. When the shaft 73 has nearly completed its rotation, the cam 100 engages the pin 87 so that the clutch sleeve 85 is cammed to its released position (Fig. 13) and the shaft comes to rest. A spring actuated detent 101 (see Figs. 15 and 16) engages a notch 102 in the clutch member 85 and thereby arrests and holds the latter in the same position after each rotation of the shaft. The movement of the chopper is very rapid and does not interrupt or interfere with the continuous forward movement of the mat.

*Tempering, spraying, and drying*

The bats B as they pass beyond the chopper are carried by the conveyor 105 into and through the tempering and drying chamber 36. The conveyor 105 may be driven at a somewhat greater speed than that of the mat so that the bats will be spaced a short distance apart in the direction of their travel. Hot air is supplied to the chamber 36 through a conduit 103 and is withdrawn from the chamber by means of suction applied through a conduit 104. An endless wire screen conveyor 105 driven from the shaft 47, carries the bats through said chamber.

The bats are next sprayed by means of the spraying apparatus 37 which may consist of spray guns of conventional construction. Various spraying materials may be used, depending upon the particular results desired and the uses to which the bats are to be put. For example, latex may be sprayed onto the bats and serves as a binding material.

After being thus sprayed, the bats are carried through the drying oven 38 on a series of narrow endless belt conveyors 106 (Figs. 4 and 5) which extend over a drive roll 107 at the end of the conveyor 105. Said roll 107 is driven from the drive shaft 47 through speed reduction gearing within the gear box 108 (Figs. 1 and 4). It will be seen by reference to Figs. 4 and 5 that the belts 106, instead of being parallel, are slightly divergent in the direction of their travel. This is for the purpose of more widely separating the bats as they advance so that when they are inverted and sprayed by the spray guns 41 the spraying material will have access to all sides or surfaces of the bats, except the under surfaces which have been sprayed by the guns 37.

*Inverting mechanism*

After the bats have passed through the drying oven 38 they are inverted by the inverting or flop-over mechanism 40 which will now be described. Such mechanism is shown in detail in Figs 17 to 21, inclusive. It includes a shaft 109 mounted in a frame 110 and extending across the machine substantially in the horizontal plane in which the bats are traveling. The shaft 109 is rotated continuously by means of a train of gears extending from the drive shaft 47 (see Figs. 18 and 19) including a gear 111 on the drive shaft, a pinion 112 running in mesh with the gear 111 and driving a gear 113 on a worm shaft carrying a worm, which drives a worm gear 114 on the shaft 109. The pinion 112 is carried on a lever 115 fulcrumed on the drive shaft. By swinging the lever about its fulcrum, the pinion 112 may be disengaged from the gear 113, permitting a gear 114 (Fig. 19) of a different size to be substituted for the gear 113, thereby adjustably varying the speed of the shaft 109 to correspond to bats of a different size, and to control the size or length of the bats in the manner hereinafter described. The lever 115 is locked in position by a clamp 116.

The inverting shaft 109 (see Fig. 21) comprises end sections 109ᵃ and an intermediate tubular section 109ᵇ, with gear boxes 117 interposed between and uniting said intermediate and end sections. Each said gear box is made in sections connected by bolts 118, one section of the gear box having a hub keyed to the hollow shaft section 109ᵇ, the other half of the gear box having a hub keyed to the shaft section 109ᵃ. A pair of rods 119ᵃ and 119ᵇ arranged on opposite sides of the shaft 109 and parallel therewith, have their ends journaled in the gear boxes 117. Said rods have keyed thereto pinions 120 within the gear boxes. Within each gear box is a rack bar 121 between the pinions 120 and having rack teeth in mesh with said pinions. Each rack bar is mounted to reciprocate lengthwise within the gear box and carries at each end a cam roll 122 adapted to run on a cam track 123 formed in a stationary cam plate 124. Attached to each of the rods 119$^a$ and 119$^b$ is a series of parallel arms 125 extending radially outward therefrom. The rod 119$^a$ with its attached arms 125 forms a holding element or wing 125$^a$. The rod 119$^b$ with its arms forms a similar holding element or wing 125$^b$, the two wings together forming a holding device for gripping the bats B as they approach the inverting mechanism and transferring them from the conveyor 106 to a conveyor 126.

The operation of the inverting or flop-over mechanism is as follows: The shaft 109 with the attached gear boxes 117 is rotated continuously in a counter-clockwise direction as viewed in Figs. 17 and 20. When the parts are in the position shown in Fig. 17, the lower wing 125$^a$ extends to the right in a downwardly inclined position and the upper wing 125$^b$ extends to the right in an upwardly inclined position permitting a bat or bats B as they advance on the conveyor 106 to be carried between said wings. During the rotation of the shaft 109 and attached gear boxes from the Fig. 17 to the Fig. 20 position, the wings 125$^a$ and 125$^b$ are carried upward and toward each other to a parallel position in which they have gripped and lifted the bats B away from the conveyor 106. During this movement, the rack 121 has been moved a short distance to the left by the stationary cam track, such movement serving to rotate the wings 125$^a$ and 125$^b$ toward each other to the gripping position. This swinging of the wings about their own axes, namely, the axes of the rods 119$^a$ and 119$^b$, takes place concurrently with their movement upward about the axis of the shaft 109. As the rotation of the shaft 109 continues, the racks 121 are held against lengthwise movement by dwell portions 123$^a$ of the cams which are concentric with the shaft 109. When the holder reaches a vertical position (shown in broken lines in Fig. 20), the upper cam roll 122 runs off the cam and the lower roll enters the cam and controls the position of the rack during the next half revolution of the shaft. The wings are held in parallelism with the bats gripped therebetween, until they have reached the forwardly inclined position 125$^c$ (Fig. 17). At this point the cam 123 commences to move the racks 121 in an upward direction, so that while the shaft 109 is completing a half rotation (180°) from the Fig. 17 position, the wings are rotated about the axes of the shafts 119$^a$ and 119$^b$ in opposite directions. This causes an accelerated forward movement of the wing 125$^b$ so that it is quickly carried downward, deposits the bats B on the conveyor 126, and advances to the position in which the wing 125$^a$ is shown in full lines in Fig. 17. At the same time the wing 125$^a$ is swung in a backward direction to the starting position of the wing 125$^b$ (Fig. 17). It will thus be seen that when the inverting shaft 109 has completed a half rotation (180°) the wings have been transposed and brought into position to receive the next succeeding bats. During the next half revolution of the shaft 109 the wings 125$^b$ and 125$^a$ are again transposed, bringing them again to the Fig. 17 position. Thus, an inverting operation is completed during each half rotation of the shaft 109.

By the inverting operation, the bats are placed opposite side up on the belt conveyor 126 which, as shown in Fig. 5, comprises a series of parallel short belts which carry the bats beneath the spray guns 41. The conveyor 126 delivers the bats onto a conveyor 127 which consists of narrow parallel endless belts extending through and beyond the drying oven 42. The conveyor 127 is operated from the drive shaft 47 which has driving connections with the belt through speed reduction gearing within a gear box 128 (Fig. 2).

In order that the bat inverting mechanism and the chopper may operate at equal time intervals and in synchronism, the circuit for the electromagnet 91 (Figs. 13 and 22) which initiates the chopper movements is controlled by a timer device 130 (Figs. 18 and 19A). This timer comprises a stationary casing 131 mounted on the end of the shaft 109, said casing being attached to a bracket 132. Within the casing 131 is a contact lever 133 secured to the shaft 109 and which, during each half revolution of the shaft, operates to close a pair of electrical contacts 134 in a circuit controlling the operation of the electro-magnet 91 as hereinafter described.

*Electrical control system*

The electrical control system shown diagrammatically in Fig. 22 will now be described. Current is supplied from a three phase alternating current system. A main switch 135 connects the leads $a$, $b$ and $c$ to the main line. A hand switch 136 is provided in the circuit for the motor 46 which, as heretofore described, drives the conveyors and other mechanism. A magnetic starter 137 for the motor 46 is controlled by a switch 138 which may be a conventional, momentary contact, two button switch. When the switch 138 is closed, it energizes a coil 139 which operates to close the switch 137, thereby completing the circuit for the motor 46. A hand switch 140 and a magnetic starter 141 are provided in the circuit of the motor 70 which operates the chopper. A push button switch 142 which may be identical in construction with the switch 138 is placed in circuit with the magnet coil 143 which actuates the starter 141.

A safety device is provided for automatically opening the circuit of the motor 70 which actuates the chopper, in the event of the latter becoming jammed during a cutting stroke, as may sometimes occur. This safety device includes a cam 144 (Figs. 8 and 11) which, when the knife is lowered during each cutting stroke, momentarily closes a switch 145 (see Fig. 22). This momentarily establishes a circuit including said switch, a coil 146 of a thermal cutout 147 and a resistor 148. The momentary closing of this circuit during normal operation of the chopper does not operate the cutout, but if the chopper becomes jammed so that said circuit remains closed for an abnormal length of time, the cutout 147 operates to open the circuit of the coil 143 and thereby actuates the starter 141 for breaking the circuit of the motor 70.

Signalling devices 149, such as electric bells or red lights, are provided in a circuit which includes an electro-magnetic relay 150. While the coil 151 of said relay is deenergized the relay switch remains closed so that the signal devices 149 are in operation. The circuit for the coil 151 extends through the starter 141 and is opened when said starter is open. During normal operation, the signals 149 are inactive. If the safety device 145 should operate, owing to the chopper becoming jammed, or if for any other reason the starter switch 141 should be opened, the relay 150 will operate to close the circuit for the signal devices 149. Said signals may be located at any convenient points. As indicated in Fig. 23, one signal is located adjacent the conveyor 127 and the other signal is located adjacent the chopper device.

The solenoid of the electro-magnet 91 which controls the operation of the chopper, is connected in circuit with a hand switch 152 and a switch 153 actuated by an electro-magnet 154. The electro-magnet 154 is in a circuit including the contacts 134 actuated by the timer 130 on the bat inverting mechanism. A hand switch 155 may be provided in circuit with the magnet coil 154. Each time the timer operates to close the switch 134 the magnet 154 is energized and closes the switch 153, thereby energizing the coil 91 and effecting an operation of the chopper as heretofore described. The timer 130 thus serves to effect a synchronized operation of the chopper and bat inverting mechanism. The hand switches 138 and 142 for starting the motors 46 and 70, respectively, may be located at any convenient position. As indicated in Fig. 23, they are located adjacent the conveyor 30.

Modifications may be resorted to within the spirit and scope of our invention.

We claim:

1. The combination of means for advancing a series of bats while supported in a cumbent position, and automatic means for inverting the advancing bats, said inverting means comprising a pair of gripping devices, means for swinging said gripping devices toward each other and thereby causing them to engage and grip the upper and lower surfaces of the advancing bats, means for swinging the gripping devices about an axis transverse to the direction of advance of the bats and thereby swinging the latter about said axis to an inverted position, and means for causing a relative swinging movement of the gripping devices away from each other during the inverting movement of the bats.

2. An article inverting mechanism comprising a shaft, means for rotating the shaft, a pair of rods parallel with the shaft and mounted to rotate therewith, arms connected to said rods and extending transversely thereof, and automatic means for rocking said rods about their axes during the rotation of said shaft and thereby moving said arms toward and from each other for gripping and releasing articles.

3. An article inverting mechanism comprising a shaft, means for rotating the shaft, a pair of rods parallel with the shaft and mounted to rotate therewith, arms connected to said rods and extending transversely thereof, and cam controlled means operable during the rotation of said shaft to rock said rods and cause the arms to grip an article and swing the article about the axis of said shaft to an inverted position.

4. An article inverting mechanism comprising a shaft, means for rotating the shaft, a pair of rods parallel with the shaft and mounted to rotate therewith, arms connected to said rods and extending transversely thereof, and cam controlled means operable during a half revolution of said shaft to rock said rods about their own axes and swing said arms from a divergent position toward each other to an article gripping position, hold said arms in said gripping position and swing the article about the axis of said shaft to an inverted position and then reverse the rocking movement of said rods and thereby bring said arms at the completion of said half revolution of the shaft, to said divergent position, but with the arms transposed.

5. An article inverting mechanism comprising a horizontally disposed shaft, means for continuously rotating the shaft, a pair of gripping elements carried with said shaft and individually rotatable about axes parallel with said shaft, a stationary cam, and means controlled by said cam for rotating said gripping elements about their said axes.

6. The combination of a shaft, means for rotating the shaft, a gear box connected to rotate with the shaft, a pair of gripping devices comprising rods parallel with the shaft and gripping arms carried by said rods, pinions mounted on said rods within the gear box, a rack between said pinions and meshing therewith, a stationary cam, and means providing an operating connection between the cam and rack.

7. The combination of a shaft, means for rotating the shaft, a gear box connected to rotate with the shaft, a pair of gripping devices comprising rods parallel with the shaft and gripping arms carried by said rods, pinions mounted on said rods within the gear box, a rack between said pinions and meshing therewith, a stationary cam, and means providing an operating connection between the cam and rack, said cam shaped to swing the gripping devices to an article gripping position, hold them in said position for inverting the article and then rotate said rods to release the article and bring said gripping devices into position for engaging a succeeding article.

8. The combination of means for advancing a mat of fibrous material, a device operable to sever the mat into individual bats as the mat advances, a device for inverting the bats, and automatic means controlled by the said inverting device for causing the said severing device to be operated in synchronism therewith.

9. The combination of means for advancing a mat at a predetermined speed, a device for periodically severing the advancing mat to form individual bats, an inverting device in advance of said severing device for inverting the bats, means for operating said devices, and timer mechanism actuated by the said inverting device for initiating the operation of the said severing device and thereby causing said devices to be operated in synchronism and at equal time intervals.

10. The combination of means for advancing a mat at a predetermined speed, a device for periodically severing the advancing mat to form individual bats, an inverting device in advance of said severing device for inverting the bats, means for operating said devices at variable frequencies and independently of the speed at which the mat advances, and automatic means controlled by said inverting device for effecting the operation of the severing device.

11. The combination of means for advancing a mat at a predetermined speed, a device for periodically severing the advancing mat to form individual bats, an inverting device in advance of said severing device for inverting the bats, means for operating said devices, a timer mechanism actuated by said inverting device, and means controlled by said timer mechanism to initiate the operation of said severing device, whereby said devices are operated in synchronism at equal time intervals.

12. The combination of means for continuously advancing a series of bats in a cumbent position, and mechanism for automatically inverting the bats including gripping devices, means for causing the gripping devices to engage and grip the upper and lower surfaces of an advancing bat, means for rotating the gripping devices and bat about a horizontal axis transverse to the direction in which the bats are advancing and thereby swinging the bat to an inverted position, and automatic means to cause a continued movement of one gripping device and a reverse movement of the other gripping device, whereby they are brought to position to receive the next succeeding bat.

13. An article inverting mechanism comprising a pair of article holding devices mounted for individual swinging movement and for swinging movement as a unit, means for swinging said devices as a unit from an article receiving position toward a discharging position and then reversing the movement of one said holding device while continuing the swinging movement of the other holding device in the same direction, and thereby bringing the holding devices to said receiving position with said devices transposed.

14. An article inverting mechanism comprising horizontally disposed article holding devices spaced one above the other to receive and hold an article therebetween, a carrier on which said holding devices are mounted for individual swinging movement, said carrier being mounted for rotation about a horizontal axis, means for rotating said carrier and said devices as a unit about said horizontal axis from an article receiving position toward a discharging position, and then reversing the movement of one said holding device while continuing the movement of the other said holding device and thereby returning said devices to said article receiving position with the positions of the individual said devices transposed.

15. The combination of a driving shaft, means for rotating it, a pair of article holding elements, supporting means by which said holding elements are mounted and supported for rotation with said shaft, and interconnected mechanism between said elements and shaft for causing said elements to rotate as a unit with the shaft for inverting an article carried thereby, and means cooperating with said mechanism then to cause rotation of said elements relative to the shaft for releasing the article in an inverted position, and thereafter returning the holding elements to an article holding position.

16. An article inverting mechanism comprising a shaft, means for rotating the shaft, a pair of rods parallel with the shaft, article holding devices attached to said rods, interconnected mechanism between said shaft and rods by which the article holding devices are caused to rotate as a unit with said shaft through a predetermined arc during an article inverting operation, and means cooperating with said mechanism and brought into activity after said inverting operation, for moving the article holding devices relatively to each other for releasing said article and for bringing said holding devices back to an article receiving position.

17. An article inverting mechanism comprising a shaft, means for rotating the shaft, a pair of rods parallel with the shaft, article holding devices attached to said rods, interconnected mechanism between said shaft and rods by which the article holding devices are caused to rotate as a unit with said shaft through a predetermined arc during an article inverting operation, and means cooperating with said mechanism and operating after said inverting operation, to swing the said holding devices about the axes of said rods in opposite directions during a continued rotation of said shaft and rods, the differential swinging movement of one said rod being such as to reverse the direction of movement of its connected holding device while the movement of the other holding device is continued at an accelerated speed due to its combined rotation with the shaft and about the axis of its said rod, whereby the holding devices are returned to an article receiving position.

DONALD C. SIMPSON.
THOMAS A. COLLINS.